United States Patent [19]
Wilson et al.

[11] Patent Number: 5,804,773
[45] Date of Patent: Sep. 8, 1998

[54] SIMPLIFIED TOUCH SCREEN WITH IMPROVED POSITION ACCURACY

[75] Inventors: Geoffrey D. Wilson; Jeffrey L. Sharp, both of Knox County, Tenn.

[73] Assignee: Elo TouchSystems, Inc., Oak Ridge, Tenn.

[21] Appl. No.: 389,911

[22] Filed: Feb. 16, 1995

[51] Int. Cl.$^6$ .............................. G08C 21/00; G09G 3/02
[52] U.S. Cl. .............................. 178/19; 178/18; 345/173; 345/174; 345/176; 345/179
[58] Field of Search ................. 178/18, 19, 20; 345/173, 174, 176, 177, 179

[56] References Cited

U.S. PATENT DOCUMENTS

| | | | |
|---|---|---|---|
| 4,678,869 | 7/1987 | Kable | 178/19 |
| 4,725,695 | 2/1988 | Murdock et al. | 178/18 |
| 4,731,508 | 3/1988 | Gibson | 178/18 |
| 4,734,870 | 3/1988 | Synder et al. | 364/556 |
| 4,797,514 | 1/1989 | Talmage, Jr. | 178/18 |
| 4,801,771 | 1/1989 | Mizuguchi et al. | 200/86 R |
| 4,897,511 | 1/1990 | Itaya et al. | 128/18 |
| 5,041,701 | 8/1991 | Wolfe et al. | 178/18 |
| 5,045,644 | 9/1991 | Dunthorn | 178/18 |
| 5,142,106 | 8/1992 | Yoshimura et al. | 178/18 |
| 5,220,136 | 6/1993 | Kent | 178/18 |

*Primary Examiner*—Curtis Kuntz
*Assistant Examiner*—ViJay Shankar
*Attorney, Agent, or Firm*—Pitts & Brittian, P.C.

[57] ABSTRACT

An improved touch sensor having a resistive surface and simplified corner electrodes for introducing electrical potentials into the resistive surface. Improved positional accuracy is achieved by selectively energizing the touch sensor transversely (either vertically or horizontally) and diagonally, in either direction. As a result, equipotential lines formed in this manner are nearly perpendicular to each other (from the two energizations) throughout a larger area of the touch sensor so that increased accuracy of position coordinates is achieved over this larger area. Provision is made to determine the quadrant of touch and to optimize the energization to achieve the increased accuracy in that particular quadrant of touch.

17 Claims, 9 Drawing Sheets

| MODE | Excitation Pattern | | | |
|---|---|---|---|---|
| | A | B | C | D |
| 3 | + | + | + | + |
| 4 | + | + | − | − |
| 5 | + | − | − | + |

Fig.8B

| MODE | Quadrant Logic if voltage>k1** |
|---|---|
| 3 | = touch detection |
| 4 | j=1 |
| 5 | k=1 |

**k1 is determined by the mode selected

Fig.8C

| j | k | |
|---|---|---|
| =1 | =1 | touch in Q-I |
| =1 | =0 | touch in Q-II |
| =0 | =0 | touch in Q-III |
| =0 | =1 | touch in Q-IV |

Enter with quadrant number
Sequence excitation per table
Measure, convert + store voltage data

Fig.9A

| Quadrant-I Excitation Pattern | | | | |
|---|---|---|---|---|
| Mode | A | B | C | D |
| 1 | + | F | − | F |
| 2 | F | + | F | − |

Fig.9B

| Quadrant-II Excitation Pattern | | | | |
|---|---|---|---|---|
| Mode | A | B | C | D |
| 1 | F | + | F | − |
| 2 | + | F | − | F |

Fig.9C

| Quadrant-III Excitation Pattern | | | | |
|---|---|---|---|---|
| Mode | A | B | C | D |
| 1 | − | F | + | F |
| 2 | F | + | F | − |

Fig.9D

| Quadrant-IV Excitation Pattern | | | | |
|---|---|---|---|---|
| Mode | A | B | C | D |
| 1 | F | − | F | + |
| 2 | + | F | − | F |

Fig.9E

SIMPLIFIED TOUCH SCREEN WITH IMPROVED POSITION ACCURACY

TECHNICAL FIELD

The present invention relates generally to touch screens whereby coordinate position of a touched location is obtained by determining voltages corresponding to the x- and y-position of the touched location, and more particularly to a touch screen of simplified design having only corner electrodes that has an expanded region of sufficient position accuracy for many applications.

BACKGROUND ART

It is well known in the art of touch sensor (i.e., touch screens) that unless special provisions are made with regard to the electrodes used to introduce the potentials into the sensor surface, there is extreme bowing of equipotential lines along the edges of the sensor, with this bowing extending inwardly a distance such that only a central portion of the sensor has sufficient position accuracy for use. While some correction can be made electronically, the useable area is small compared to the total area of the sensor. Therefore, it has become standard in the art of touch sensors to utilize quite complex electrodes, or combinations of complex electrodes, to overcome the bow of equipotential lines near the edges of touch sensors to increase the percentage of area of position accuracy. Such touch sensors are those described in patents of a common assignee, for example U. S. Pat. Nos. 4,071,689 issued Jan. 31, 1978; 4,220,815 issued Sep. 2, 1980; 4,661,655 issued Apr. 28, 1987; 4,731,508 issued Mar. 15, 1988; 4,777,328 issued Oct. 1988; 4,797,514 issued Jan. 10, 1989; 4,822,957 issued Apr. 18, 1989; and 5,045,644 issued Sep. 3, 1991. All of these devices are expensive to construct and calibrate for position accuracy. Other patents embracing complex electrode geometry are described in patents cited in the above-recited patents. These, too, are expensive to construct and calibrate.

However, if a touch screen having only simple electrodes, and a method of operation therefor, can be developed to increase the area of satisfactory position accuracy, an inexpensive sensor for many applications would be available.

Accordingly, it is an object of the present invention to provide for the operation of a touch sensor having simple corner electrodes wherein an increased region of position accuracy is achieved such that sufficient accuracy can be accomplished by "back-extraction" electronic techniques.

Another object of the present invention is to provide a rectangular touch sensor having simple electrodes in the corners for introduction of potentials into a resistive surface of the sensor, with a method of operation whereby both transversely- and diagonally-oriented equipotential lines are produced within the resistive surface so as to create nearly perpendicularly-oriented equipotential lines in regions more closely approaching the electrodes and thereby increase the position accuracy of the sensor over a wider area.

A further object of the present invention is to provide a method of operating a touch sensor having only corner electrodes wherein potentials are alternately introduced transversely across the sensor and diagonally across the sensor to achieve substantially perpendicular equipotential lines throughout a major portion of the sensor to achieve the improved position accuracy in the sensor over an extended portion of the sensor.

These and other objects of the present invention will become apparent upon a consideration of the drawings referred to hereinafter, and from a detailed description thereof.

SUMMARY OF THE INVENTION

In accordance with the present invention, there is provided a touch sensor having a resistive surface and only simplified corner electrodes for introducing electrical potentials into the resistive surface. Improved position accuracy is achieved by alternately energizing the touch sensor transversely (either vertically or horizontally) and then diagonally. As a result, equipotential lines formed in this manner are nearly perpendicular to each other (from the two energizations) so that the increased region of position accuracy is achieved.

BEST MODE FOR CARRYING OUT THE INVENTION

In order to best understand the value of the present invention with regard to touch sensors, an understanding of the problem that would be associated with simple corner electrodes on a resistive sheet, when the sensor is energized in a conventional manner, is thought to be pertinent. Such a device is illustrated in FIG. 1 wherein corner electrodes A, B, C and D are shown attached to a resistive surface 10.

If the sensor is energized according to common practice, horizontal equipotential lines 12 are created when both electrodes A and B are energized by a common voltage source, and electrodes C and D are both at ground potential (or a potential different from that of the other two electrodes). This creates a vertical gradient in the resistive surface. In a separate time interval (e.g., every 50 msec), vertical equipotential lines 14 are created by applying a common voltage to electrodes A and C while electrodes B and D are at ground (or another common potential) to create a horizontal gradient. With this type of operation, it can be seen that the horizontal and vertical equipotential lines near the corners, as at 16, are nearly parallel, i.e., essentially do not intersect. Under these conditions, no meaningful position information can be derived (since the region of position uncertainty can be large and non-symmetrical) except well removed from the corners. While perpendicular intersections are ideal, touch location data of equal accuracy can be computed when they are "nearly perpendicular", this meaning intersecting at an angle of at least forty-five degrees. Although this FIG. 1 (as well as all the illustrations of equipotential lines) is computer generated, actual equipotential lines would have a similar orientation.

Figure 1:
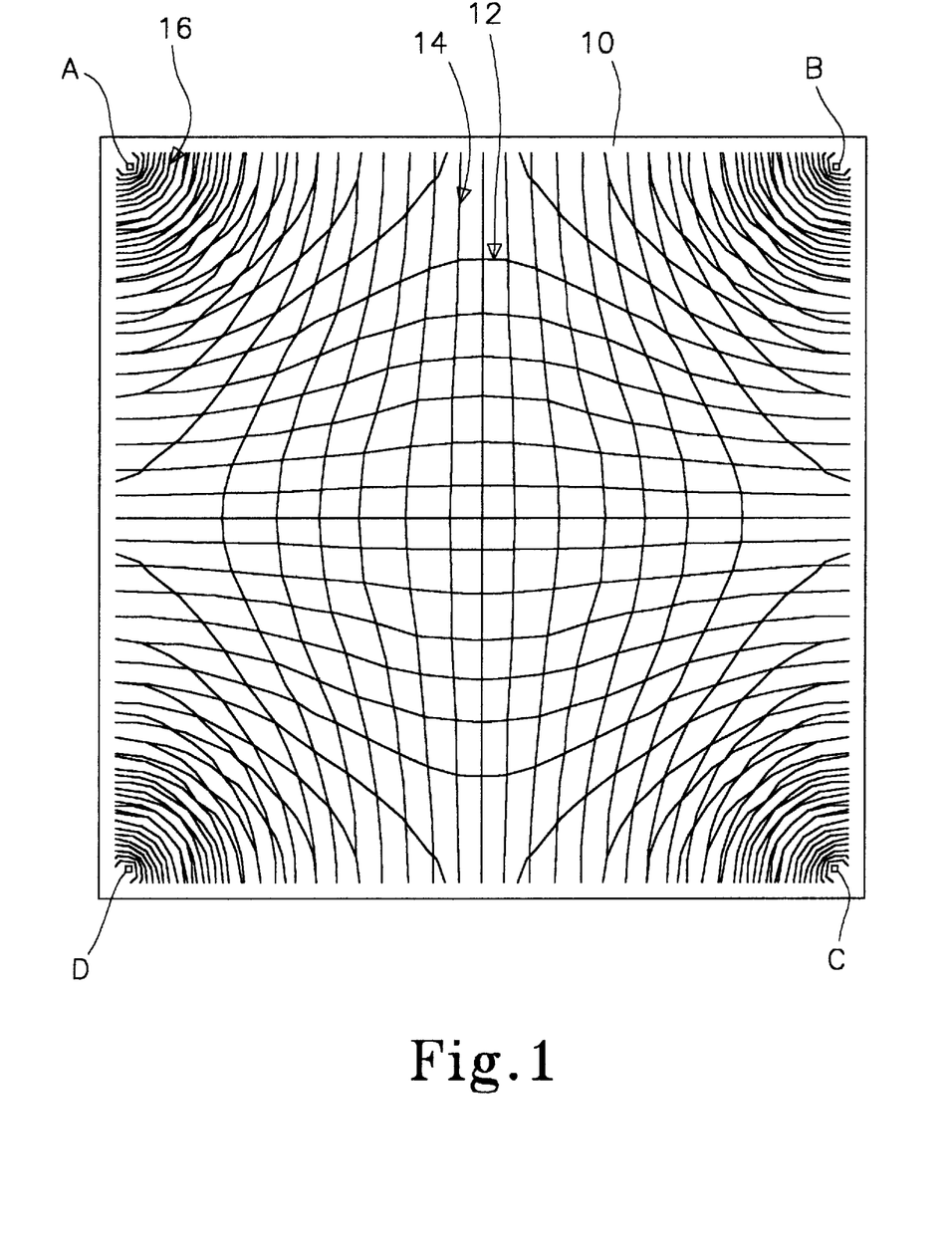
FIG. 1 is a computer drawn representation of a touch sensor illustrating vertical and horizontal equipotential lines created within the resistive surface of a substantially square touch sensor if energized alternately both horizontally and vertically using a singular electrode in each corner of the surface.
Figure 2:
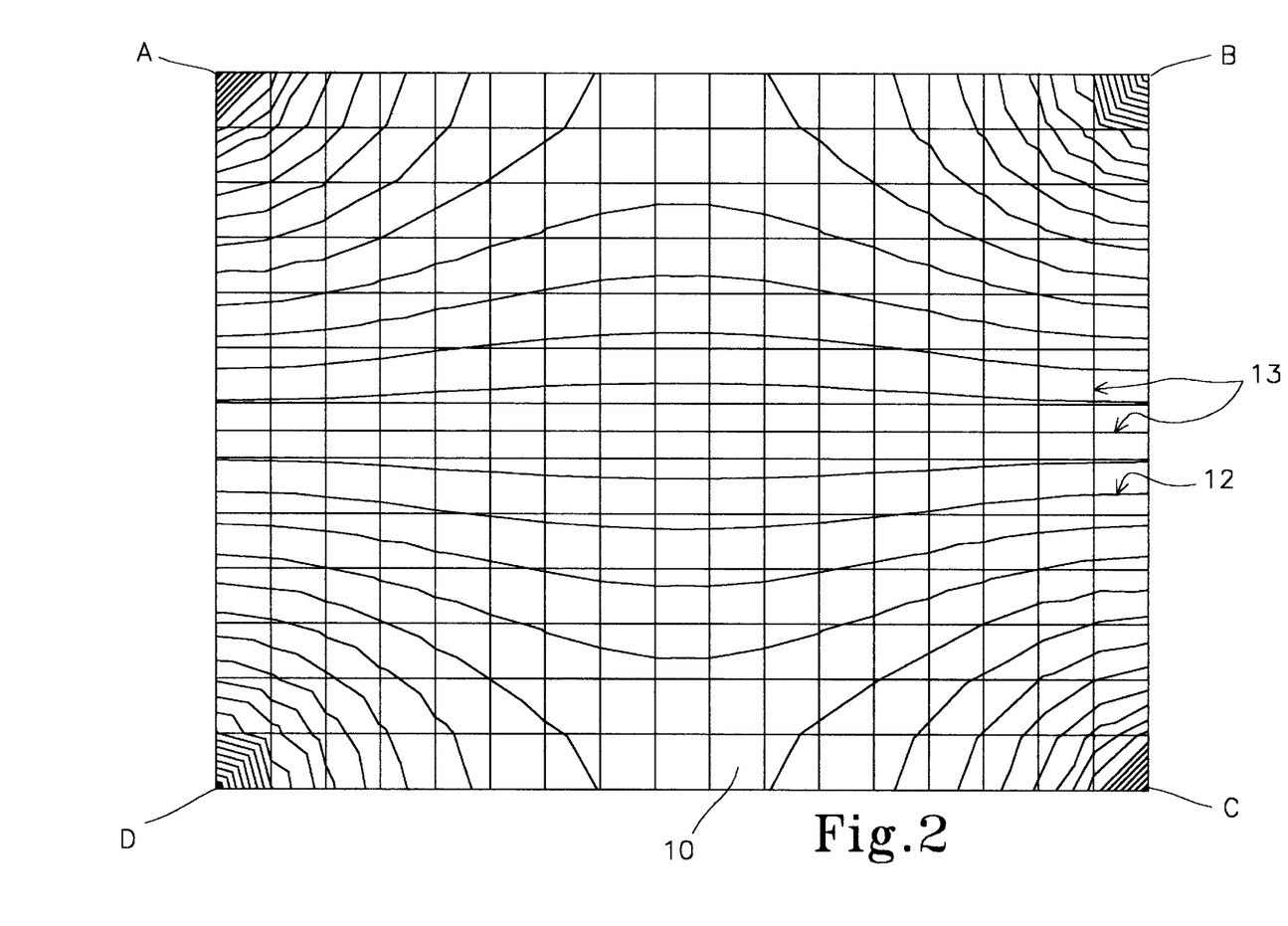
FIG. 2 is a computer drawn representation of horizontal equipotential lines similar to those of FIG. 1; however, these are shown for a touch sensor having a length:height ratio of 4:3.

Only the horizontal equipotential lines 12 as obtained for FIG. 1, are shown in computer-drawn FIG. 2, but for a touch sensor having a width:height ratio of 4:3. The grid lines 13 are drawn simply for orientation, as in the case of FIG. 3. As above, these horizontal equipotential lines are created by applying a selected voltage to both electrodes A and B, with a different voltage (e.g., zero) being applied to both electrodes C and D. It will be recognized that vertical equipotential lines can be created if a selected voltage is applied to both electrodes A and C, with a different voltage (e.g., zero) being applied to both electrodes B and D.

Figure 3:
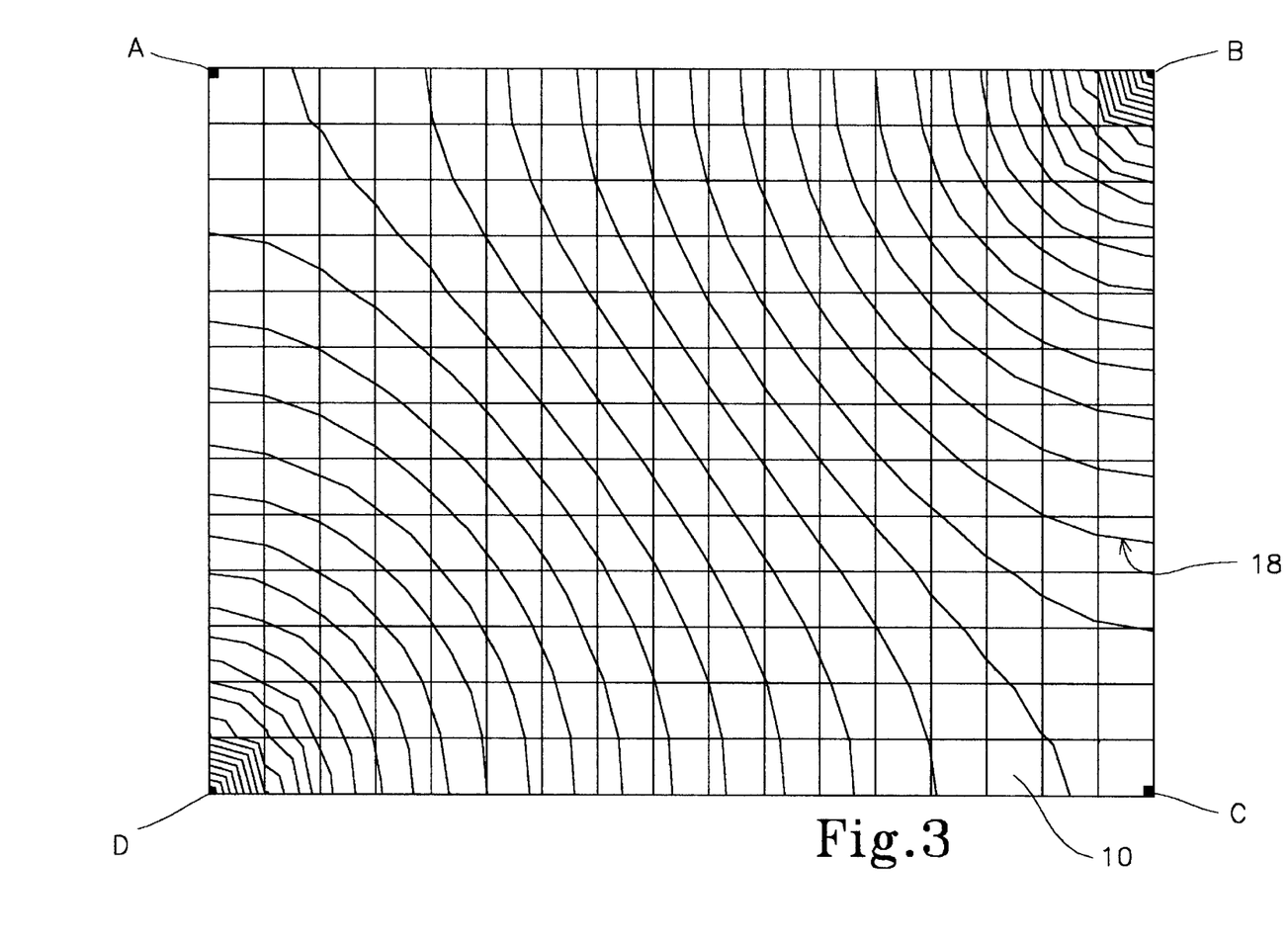
FIG. 3 is a computer drawn representation of equipotential lines within a resistive surface having a length:height ratio of 4:3 by applying a voltage diagonally to singular corner electrodes, this figure showing the equipotential lines near the non-excited corners to have a diagonal characteristic.

In accordance with the present invention a diagonal energization of a touch sensor of the shape of that of FIG. 2 is illustrated in FIG. 3. The diagonal equipotential lines 18 are created by applying a selected voltage to electrode B, with a different voltage (e.g., zero) being applied to electrode D. During this time electrodes A and C are "floating" (no voltage applied, e.g., they are non-energized). It will be recognized that a specific voltage gradient also can be applied to electrodes A and C, with electrodes B and D floating. This is the case with the plots of FIGS. 4 and 5. Thus, where a nearly perpendicular orientation is needed near a specific corner of the touchscreen, that corner should be non-energized.

Figure 4:
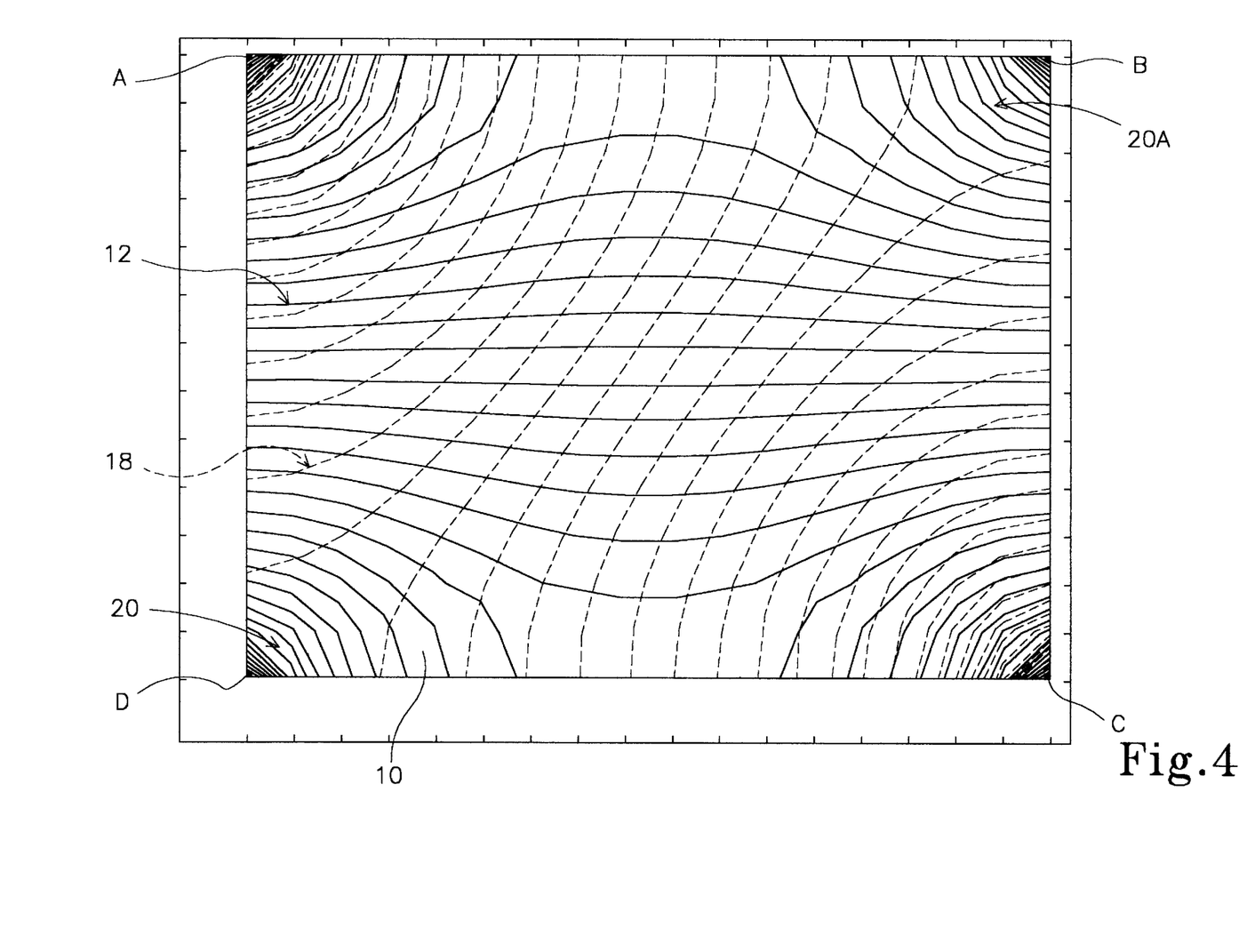
FIG. 4 is a computer drawn representation of superimposed equipotential lines within a resistive surface as created by alternating horizontal energization and diagonal energization and showing an increased angle of intersection of the two equipotential lines toward non-excited corners of the touch sensor.

Then, shown in FIG. 4 is a combination of the horizontal equipotential lines 12 (solid lines) with diagonal equipotential lines 18 (dashed lines) of FIG. 3. The diagonal equipotential lines 18 were created by applying a voltage gradient between electrodes A and C. A comparison of FIG. 4 with FIG. 1 shows that a significantly larger angle exists between the two sets of equipotential lines of FIG. 4 in a region toward the non-excited electrodes B and D (as at 20, 20A) of the touch sensor. This provides a basis for the computation of accurate touch positions across the working surface of the touch sensor. As will be discussed hereinafter, the quadrant of the touch sensor being touched can be used to select the direction of the energization both diagonally and either horizontally or vertically according to which excitation mode provides the greatest angle of intersection and thus the greatest accuracy. Either horizontal or vertical excitation can be referred to as "transverse excitation" in contrast to "diagonal excitation".

Figure 5:
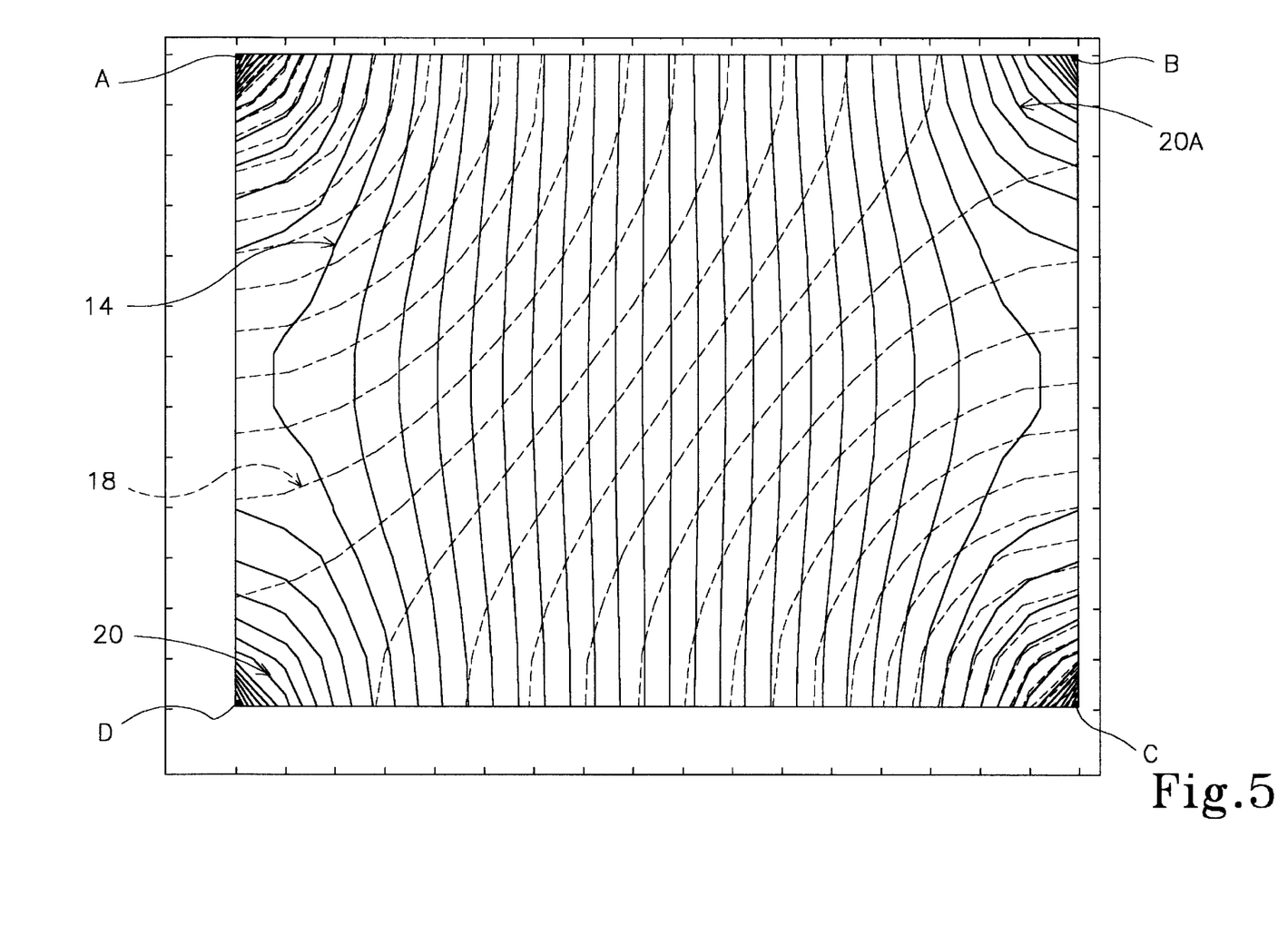
FIG. 5 is a computer drawn representation of superimposed equipotential lines within a resistive surface as created by alternating vertical energization and diagonal energization and showing an increased angle of intersection of the two equipotential lines toward non-excited corners of the touch sensor.

FIG. 5 is a similar representation of equipotential lines; however, these are vertical (solid) and diagonal lines (dashed). As in FIG. 4, a desired orientation of equipotential lines is formed near the non-excited corners during diagonal energization.

By an extension of this dual energization of the touch sensor (as illustrated in FIGS. 4 and 5), an asymmetrical distribution of the equipotential lines may be created by the application of a voltage to one electrode, and a different voltage to another electrode of the energization scheme.

Figure 6:
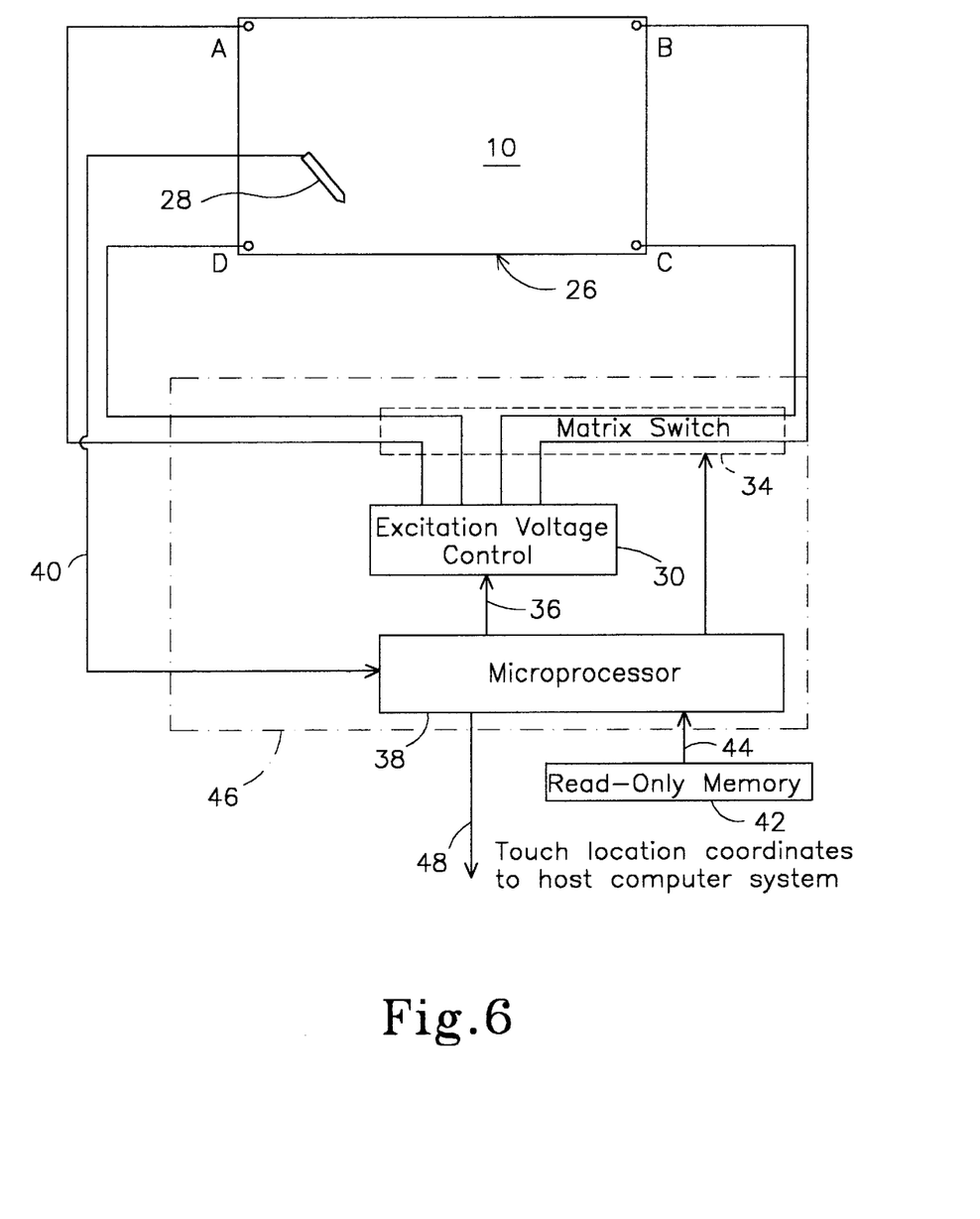
FIG. 6 is a schematic circuit diagram of a touch sensor system for utilizing the present invention.

FIG. 6 is a schematic circuit diagram of a touch sensor that will create equipotential lines such as those shown in FIG. 3. A touch sensor "tablet" 26 has the afore-mentioned electrodes A, B, C, and D attached to a resistive surface 10. This drawing illustrates one means for contacting the touch sensor 26; namely, a probe 28. More typically, a conductive sheet overlying the resistive surface 10 (not shown) is the means for contact; however, the probe 28 in combination with a conductive sheet also can be utilized as is known by persons skilled in the art.

The four corner electrodes are connected to an excitation voltage control 30 using leads such as indicated at 32. The excitation voltage control 30 provides a selected voltage (e.g., five volts) at the appropriate timing intervals to the electrodes A–D. If an option for selecting different energization voltages is desired, a matrix switch 34 can be used between the voltage control 30 and the electrodes A–D. The excitation voltage control 30 (together with the matrix switch 34, if used) can be referred to as a voltage source/sequencer. Further, the voltage control 30 receives an operating signal via lead(s) 36 from a microprocessor 38. This microprocessor also receives the signal from the probe 28 on lead 40. Control, including the introduction of subroutines, for the microprocessor can be through a read-only memory 42 connected thereto with lead 44. All of the elements 30 and 34-38 can be contained within an integrated circuit, as indicated at 46. Information signals as to the touch position (X- and Y-coordinates) are carried to a host computer system for any further processing on lead 48.

Figure 7:
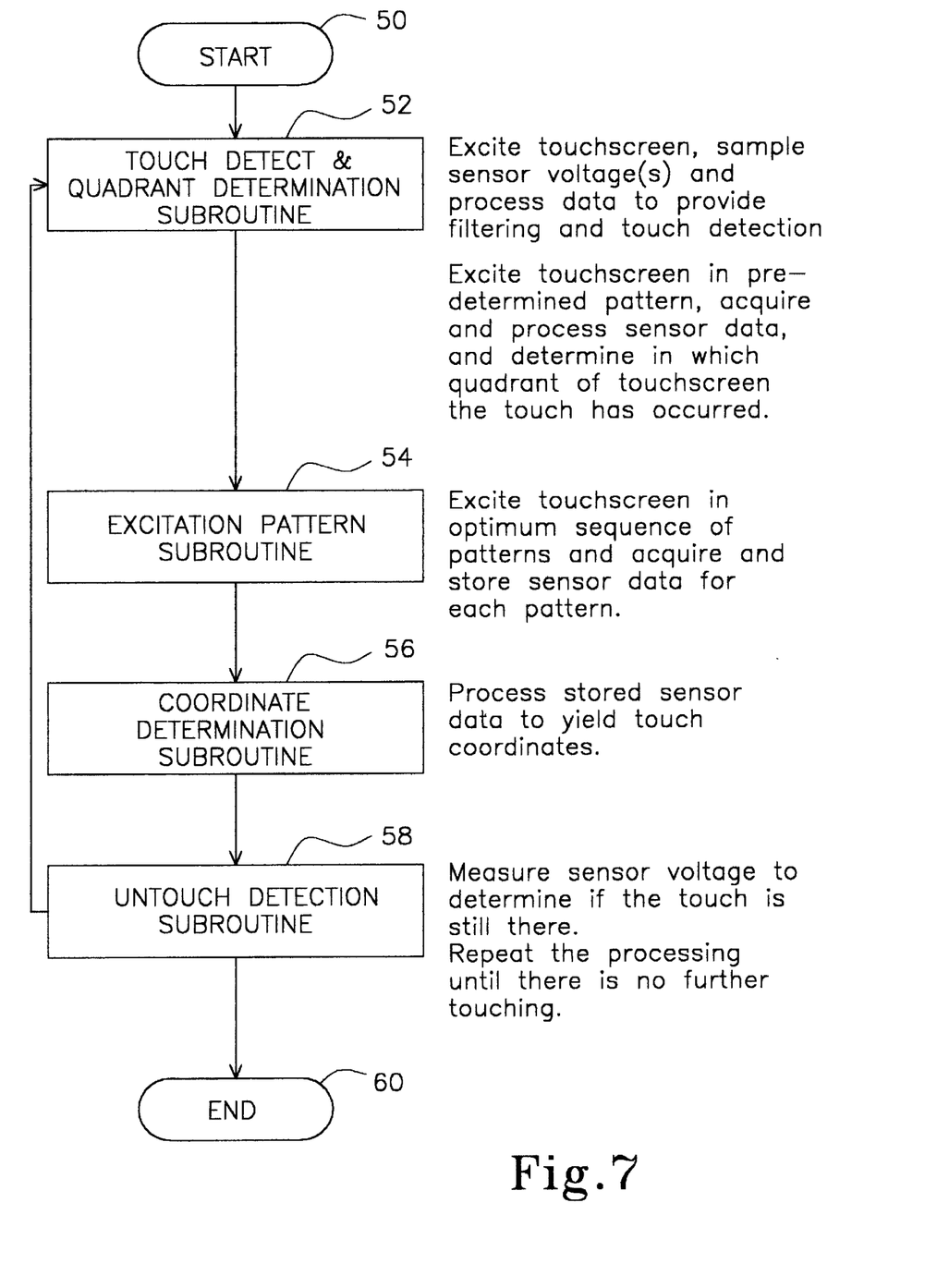
FIG. 7 is a flow diagram illustrating the basic steps of information processing with the present invention.

A brief summary of operation of the circuit of FIG. 6 is shown in the flow diagram of FIG. 7. Following a start of position determination (50), actual touch is ascertained and the quadrant of touch is determined (52) through a subroutine of the microprocessor 38. The steps for quadrant determination are discussed below. Thereafter, the touchscreen is excited via another subroutine in a preferred manner (transversely and/or diagonally) so as to achieve optimum positional accuracy (54). At this point, touch coordinates are determined (56). Should contact be lost, a subroutine indicated at 58 either recycles the system to the touch detection step 52, or ends the process (60) for a particular touch sequence. The system then goes to "Start" (50) to await the next touch.

Figure 8A:
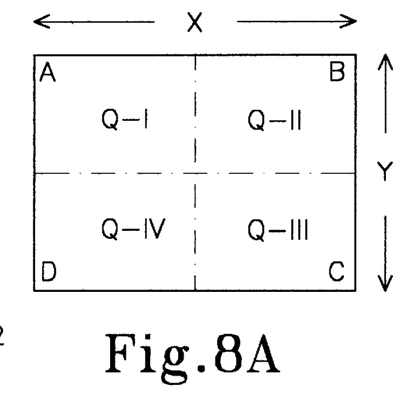
FIGS. 8A through 8E are drawings, including a logic flow diagram, illustrating the steps of determining the quadrant of the touchscreen containing the touched position.
Figure 8B:
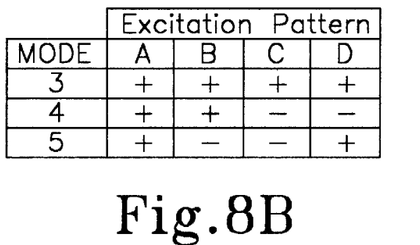

Determination of the quadrant of touch can be understood by referring to FIGS. 8A–8E. The four possible quadrants Q-I through Q-IV make up the touchscreen having the electrodes A–D as shown in FIG. 8A. For quadrant determination, there are three modes of excitation of the touchscreen as indicated in FIG. 8B. In Mode 3 excitation, all electrodes A–D are maintained at a common voltage (+). For Mode 4 excitation, electrodes A and B are at this common voltage (+) while electrodes C and D are maintained at some lower voltage (-). This gives vertical excitation. Then in Mode 5 excitation, electrodes A and D are at the common voltage (+) while electrodes B and C are at the lower voltage (-), giving horizontal excitation.

Figure 8C:
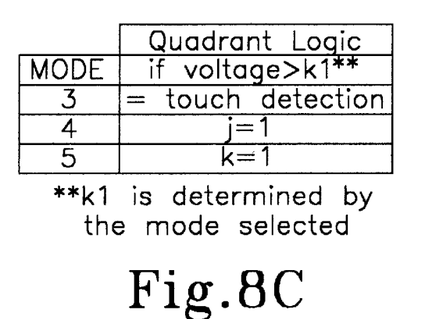
Figure 8D:
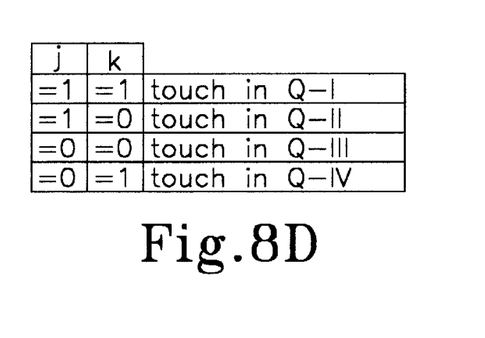

Signals derived from the probe 28 determine the quadrant according to the information shown in FIGS. 8C and 8D. In Mode 3 excitation, any signal indicates touch detection. Mode 4 excitation sets a "j" key in the microprocessor 38, while Mode 5 excitation sets a "k" key. The microprocessor typically has data stored from a calibration of the resistive layer so that the actual data can be compared with the stored data as to quadrant, etc. If both "j" and "k" are unity (see FIG. 8D), the touch is in Q-I; if "j" is unity and "k" is zero, the touch is in Q-II; if both "j" and "k" are zero, the touch is in Q-III; and if "j" is zero and "k" is unity, the touch is in Q-IV.

Figure 8E:
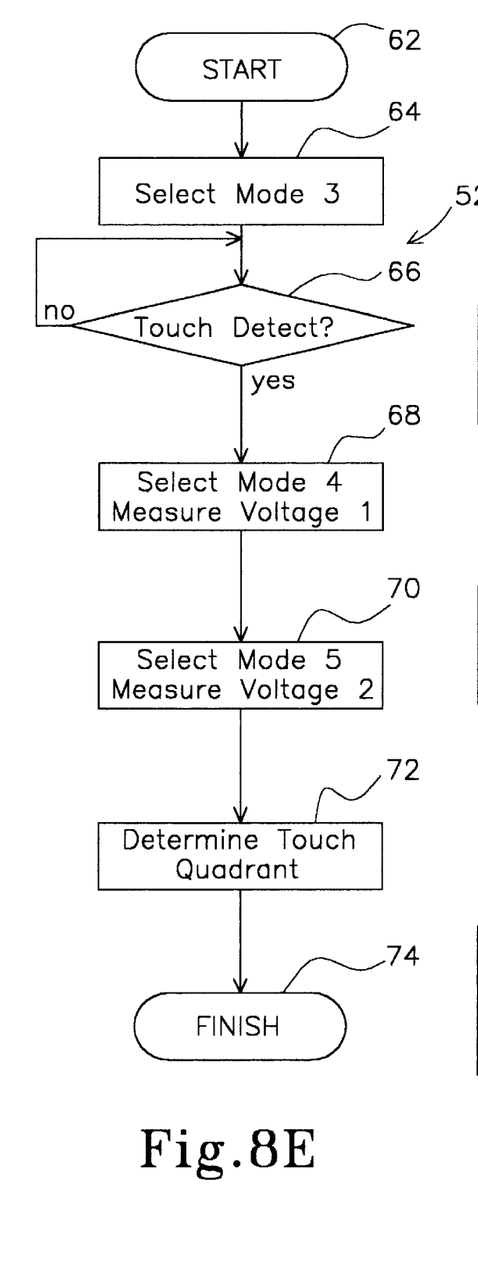

A logic flow diagram for this quadrant determination is illustrated in FIG. 8E. This is the subroutine indicated at 52 of FIG. 7. At start signal (62) Mode 3 excitation (see FIG. 8b) is created on the touchscreen to ascertain whether touch is achieved (64). If not, a further switch to Mode 3 excitation is attempted. If touch is determined, then Mode 4 excitation is selected (68). This provides a first voltage. Mode 5 excitation is then selected (70) to provide a second voltage. These two voltages are used by the microprocessor 38 to determine the quadrant (72) according to FIG. 8D. Thereafter, the subroutine is turned off (74). This subroutine functioning is ongoing whenever a new touch point occurs.

Using the information as to the quadrant of the touch, optimum energizations of the touch screen can occur. This choice of the optimum energizations can be understood by referring to FIGS. 9A through 9E. The modes of excitation are detailed in FIGS. 9B through 9E, and FIG. 9A shows the logic flow diagram for the determination of the information as to the coordinates of the touched point. In FIGS. 9B through 9E Mode 1 excitation represents one diagonal energization of the touchscreen, as in FIGS. 4 and 5; while Mode 2 excitation represents a second and opposite diagonal energization. The designation "F" indicates that these electrodes are "floating", e.g., non-excited.

Figure 9A:
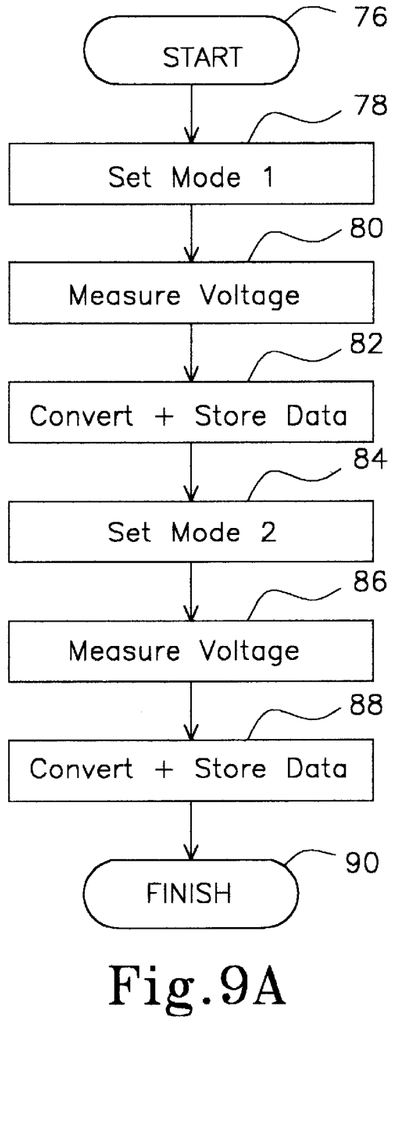
FIGS. 9A through 9E are drawings, including a logic flow diagram, illustrating the steps of actual determination of touch position coordinates.
Figure 9B:
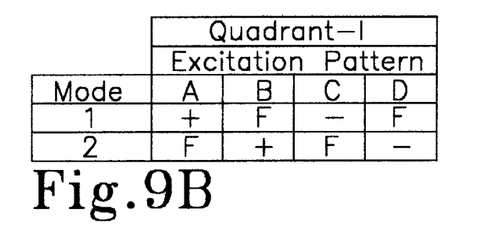
Figure 9C:
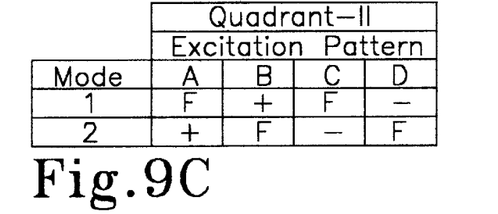
Figure 9D:
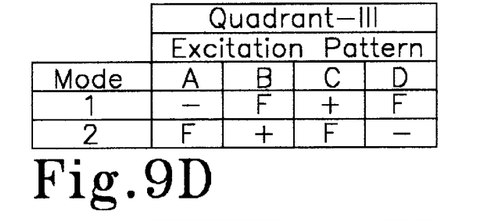
Figure 9E:
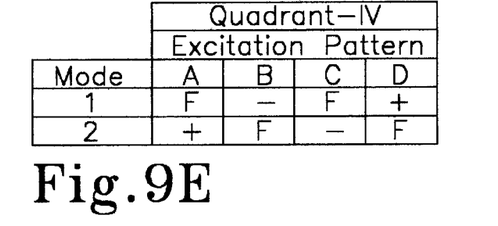

With the quadrant having been determined via the subroutine 52 explained in FIGS. 8A–8E, the subroutines 54 and 56 (see FIG. 7) are utilized as shown in FIG. 9A, beginning at "Start" (76). The appropriate Mode 1 excitation for the quadrant is set (78), and a voltage is measured (80) via the probe 28 (or equivalent) and microprocessor 38, with this being converted and stored (82) in the microprocessor. Next, the appropriate Mode 2 excitation for the quadrant is set (84), and a voltage from the probe 28 (or equivalent) is measured (86). As with the first voltage, this is converted and stored (88). Thereafter, the subroutine(s) are finished (90) for a given touch point. These steps are ongoing for additional touch points. The various modes of excitation are rapidly repeated as many times as desired to obtain sufficient data to satisfactorily compute the coordinates of the touched point. It will be understood by persons skilled in the art that other combinations of voltages to the electrodes in appropriate time intervals will produce the transverse (either horizontal or vertical) voltage gradient and the diagonal voltage gradient.

From the foregoing, it will be understood by persons skilled in the art that improved touch sensor operation can be achieved with simple electrodes by producing a transverse voltage gradient and a diagonal voltage gradient in separate time intervals. The choice of optimum excitations can be made for the quadrant of touch. The result is a creation of equipotential lines that intersect nearly perpendicularly over a larger area of the touch sensor and thereby provide positional accuracy over this larger area.

While a specific combination of voltage application to the electrodes has been described for the purpose of illustrating the present invention, this has not been for the purpose of limiting the invention. Rather, the invention is to be limited only by the appended claims and their equivalents.

We claim:

1. A touch screen system to generate signals representing the x- and y-coordinates of a position contacted thereon, said touch screen system comprising:
   a resistive surface defined by a first pair of oppositely disposed edges and a second pair of oppositely disposed edges arranged orthogonally with said first pair of edges;
   a set of electrodes electrically in contact with said resistive surface, each electrode of said set of electrodes positioned proximate intersections of said first and second pairs of oppositely disposed edges; and
   means connected to said set of electrodes for repetitively generating, in separate time intervals,
      a) a transverse voltage gradient between a pair of oppositely-disposed edges of said resistive surface, and
      b) at least one diagonal voltage gradient between a pair of diagonally-disposed corners of said resistive surface;
   whereby equipotential lines created by said transverse and diagonal voltage gradients throughout said resistive surface intersect in a nearly perpendicular orientation throughout a major portion of said resistive surface.

2. The touch screen system of claim 1 wherein said means connected to said set of electrodes for generating said transverse and diagonal voltage gradients is a voltage source/sequencer unit for applying voltages to said set of electrodes in said separate time intervals, and further comprises:
   a contact means for contacting said resistive surface at the contact position to derive signals corresponding to potentials in said resistive surface in said separate time intervals; and
   analysis means for receiving said signals from said contact means and determining therefrom coordinates of the contact position.

3. The touch screen system of claim 2 wherein said analysis means is a unit microprocessor for said voltage source/sequencer, said unit microprocessor containing a subroutine to determine a quadrant of said resistive surface touched by said contact means.

4. The touch screen system of claim 3 wherein said microprocessor unit further contains a subroutine to control generating one of said diagonal voltage gradients according to said quadrant to enhance positional accuracy of said coordinates of the contact position.

5. The touch screen system of claim 2 wherein said contact means is a conductive sheet, connected to said analysis means, overlying said resistive surface whereby contact of said conductive sheet at the contact position causes said conductive sheet to contact said resistive surface at that position to derive said signals for said analysis means corresponding to potentials in said resistive surface in said separate time intervals.

6. A touch screen system to generate a signal representing two dimensional coordinates of a position contacted thereon, said touch screen system comprising:
   a resistive surface defined by a first pair of oppositely disposed edges and a second pair of oppositely disposed edges arranged orthogonally with said first pair of oppositely disposed edges;
   a set of electrodes electrically in contact with said resistive surface, each electrode of said set of electrodes positioned proximate intersections of said first and second pairs of oppositely disposed edges;

a voltage source/sequencer unit connected to said set of electrodes for repetitively applying voltages to said set of electrodes and generating, in separate time intervals,
  a) a transverse voltage gradient between a selected one of said first and second pair of said oppositely disposed edges, and
  b) at least one diagonal voltage gradient diagonal with respect to said transverse voltage gradient;

whereby equipotential lines generated by said transverse and diagonal voltage gradients throughout said resistive surface intersect in a nearly perpendicular orientation throughout a major portion of said resistive surface;

a contact means for contacting said resistive surface at the contact position to derive signals corresponding to potentials in said resistive surface in said separate time intervals; and analyzer means connected to said contact means for receiving said signals and determining therefrom coordinates of the contact position.

7. The touch screen system of claim 6 wherein said contact means is a conductive sheet, connected to said analyzer means, overlying said resistive surface whereby contact of said conductive sheet at the contact position causes said conductive sheet to contact said resistive surface at that position to derive said signals for said analyzer means corresponding to potentials in said resistive sheet in said separate time intervals.

8. The touch screen system of claim 6 wherein said voltage source/sequencer unit comprises:
  a matrix switch unit connected to said set of electrodes; and
  an excitation control unit connected to said microprocessor unit and to said matrix switch unit to control operation of said matrix switch unit.

9. A method for producing signals corresponding to a two dimensional coordinate position of contact with a touch screen, said touch screen having a resistive surface defined by a first pair of oppositely disposed edges and a second pair of oppositely disposed edges arranged orthogonally with said first pair of oppositely disposed edges, said method comprising:
  providing a first set of electrodes electrically in contact with said resistive surface, each electrode of said first set of electrodes positioned proximate intersections of said first and second pairs of edges;
  repetitively applying voltages to said first set of electrodes for generating within said resistive surface, in separate time intervals,
    a) a transverse voltage gradient between an oppositely-disposed pair of said edges of said resistive surface, and
    b) a diagonal voltage gradient between oppositely-disposed corners of said resistive surface;
  detecting a series of output voltages from said resistive surface at the contact position due to said voltage gradients; and
  converting said series of output voltages into a signal related to the two dimensional coordinate position of the contact.

10. The method of claim 9 further comprising the step of deriving from said series of output signals information as to a quadrant of the position of contact with the touch screen.

11. The method of claim 10 further comprising selecting a diagonal voltage gradient to enhance positional accuracy of the two dimensional coordinate position of the contact in the quadrant of the position of contact.

12. A touch screen system to generate a signal representing two dimensional coordinates of a position contacted thereon, said touch screen system comprising:
  a resistive surface defined by a first pair of oppositely disposed edges and a second pair of oppositely disposed edges arranged orthogonally with said first pair of oppositely disposed edges;
  a set of electrodes electrically in contact with said resistive surface, each electrode of said set of electrodes proximate intersections of said first and second pairs of oppositely disposed edges;
  a voltage source/sequencer unit connected to each electrode of said set of electrodes for applying a voltage to selected of said electrodes in separate time intervals whereby said voltage applied to selected of said electrodes generates a transverse voltage gradient between a pair of oppositely disposed edges of said resistive surface, and at least one diagonal voltage gradient between a pair of diagonally-disposed corners of said resistive surface;
  contact means for contacting said resistive surface at the contact position to derive signals corresponding to potentials in said resistive surface at the contact position in said separate time intervals; and
  a microprocessor unit connected to said contact means and programmed for providing operating signals to said voltage source/sequencer unit, for receiving and analyzing said signals from said contact means, and for providing output signals corresponding to coordinates of the contact position.

13. The system of claim 12 further comprising a read-only memory for providing programs to said microprocessor unit.

14. The system of claim 13 wherein said read-only memory provides a subroutine to said microprocessor unit for determining a quadrant of the contact position of the touch means.

15. The system of claim 14 wherein said read-only memory provides a subroutine to said microprocessor unit for controlling said voltage source/sequencer unit to generate transverse and diagonal voltage gradients within said resistive surface for substantially perpendicular orientation of equipotential lines within said resistive surface for positional accuracy of determination of the coordinates of the contact position.

16. The touch screen system of claim 12 wherein said contact means is a conductive sheet, connected to said microprocessor unit, overlying said resistive surface whereby contact of said conductive sheet at the contact position causes said conductive sheet to contact said resistive surface at that position to derive said signals for said microprocessor corresponding to potentials in said resistive surface in said separate time intervals.

17. The touch screen system of claim 12 wherein said voltage source/sequencer unit comprises:
  a matrix switch unit connected to said set of electrodes; and
  an excitation control unit connected to said microprocessor unit and to said matrix switch unit to control operation of said matrix switch unit.

* * * * *